United States Patent Office 2,933,456
Patented Apr. 19, 1960

2,933,456

PREPARATION OF SILICA-ALUMINA COMPOSITIONS

David G. Braithwaite, Chicago, Ill., assignor to Nalco Chemical Company, a corporation of Delaware No Drawing. Application June 7, 1954
Serial No. 435,070

9 Claims. (Cl. 252—451)

This invention relates to silica-alumina compositions, more particular silica-alumina catalysts and to a new and improved process for the preparation thereof.

In the manufacture of silica-alumina compositions of the type employed as catalysts for the cracking of petroleum hydrocarbons, the most common procedure is to neutralize a dilute alkali metal silicate aqueous solution with a dilute aqueous solution of an acid and then impregnate the resultant precipitated silicic acid with aluminum sulfate from which aluminum hydroxide is precipitated by reaction with aqueous ammonia. The employment of aqueous ammonia is a disagreeable manufacturing step due to the volatility of the ammonia.

One of the objects of the present invention is to provide a new and improved process for making silica-alumina compositions which does not involve the employment of aqueous ammonia or other ammonium compounds which liberate ammonia gas.

A further object of the invention is to provide a new and improved process for manufacturing silica-alumina compositions which results in compositions that are suitable for use as catalysts, for example, in the cracking of petroleum hydrocarbons and are at least equivalent and in certain respects superior to standard catalysts heretofore employed.

An additional object of the invention is to provide a process for producing silica-alumina compositions having satisfactory physical and chemical characteristics for employment as catalysts characterized by the fact that some of the alumina present in the finished product is derived from an anion source and another portion of the alumina present in the finished product is derived from a cation source as distinguished from the standard procedure of making catalysts wherein all of the alumina comes from a cation source.

Another object of the invention is to provide glass-like silica-alumina compositions in microspherical form having satisfactory physical and chemical properties for use as catalysts in fluidized catalytic processes.

Another object of the invention is to provide a new and improved method for producing silica-alumina compositions characterized by the fact that the resultant product is essentially a clear glass-like material in microspherical form with substantially no opaque particles and no interfaces between different phases of the microsphere which would tend to produce a weaker particle.

An additional object of the invention is to produce new and useful silica-alumina glass-like microspheres which exhibit high surface area, optimum pore volume and satisfactory density.

A more specific object of the invention is to provide a new and improved process and new and improved silica-alumina compositions wherein the products obtained consist predominantly of silica but contain a relatively high proportion of alumina as compared with standard compositions normally employed at the present time as cracking catalysts.

A further object of the invention is to prepare silica-alumina catalysts characterized by good steam stability. Other objects will appear hereinafter.

In accordance with the invention these objects are accomplished by preparing a silica-alumina composition by a procedure which involves the following steps:

(1) The silica is precipitated from an alkaline aqueous solution by adding an aqueous solution of an acid thereto, preferably an aqueous solution of a mineral acid, for example, sulfuric acid or hydrochloric acid, having a concentration sufficiently low to prevent localized reaction and substantial heat generation during the addition of the aqueous acid solution.

(2) The quantity of the aqueous acid solution added to the alkaline aqueous silicate solution is sufficient to precipitate silica in hydrous form and to lower the pH of the resultant solution, preferably until the solution is still mildly alkaline (e.g., around pH 8 to 10.5), although the pH can be reduced to as low as about 5 in this step.

(3) An acidic aqueous solution of an aluminum salt in which aluminum is present in the cation only (e.g., aluminum sulfate or aluminum chloride, preferably the former), is added to the slurry obtained from step 2 to further lower the pH of the resultant slurry, preferably to around pH 2 or below, and to precipitate alumina in hydrous form.

(4) An aqueous solution of an aluminum salt in which the aluminum exists in the anion (e.g., sodium aluminate or calcium aluminate) is added to the slurry obtained from step 3 to partially neutralize the acidity produced by the addition of the acid solution of aluminum salt, preferably to a pH of around 5 to 5.5, simultaneously impregnating the silica gel with alumina precipitated from both sources.

(5) The dilution of the aqueous solution of aluminum salt in step 4 is preferably such that the weight ratio of water to said salt, expressed as $Na_2Al_2O_4$, is at least 7.5:1 and preferably about 15:1, or more. The volume dilution of a sodium aluminate solution is usually at least 5:1 and preferably around 10:1. More dilute solutions can be used but do not substantially improve the results and tend to create additional problems in removing water from the final product. While catalysts obtained by using relatively concentrated aluminate solutions are useful, it has been found in the practice of the invention that alumina precipitated from a concentrated aluminate solution is not the same as alumina precipitated from the dilute aluminate solution and the resultant compositions derived by the employment of dilute aluminate solutions are more desirable for employment in catalytic processes, especially in catalytic processes for cracking petroleum hydrocarbons.

(6) The slurry obtained after step 4 is preferably filtered to increase the total solids concentration to in excess of 8% by weight of the composition. This filtration step is optional but is particularly important where it is desired to produce microspheres having a particle size within the range of 20 microns to 100 microns, which is a desirable particle size for fluidized catalysts. The filtering step also affects a substantial purification by the removal of dissolved salts and enhances the formation of a continuous phase in the microspherical particles that are subsequently formed. If the slurry is filtered and it is desired to spray dry the filter cake, the latter should be reslurried with enough water to produce a pumpable mixture.

The relative proportions of silica and alimina in the final product can be varied but the products prepared in accordance with the invention preferably consist essentially of 55% to 95% by weight of silica and 5% to 45% by weight of alumina on a dry basis, that is, without taking into consideration the water present in the gel structure of the silica and alumina. The invention is very well adapted to the manufacture of a standard catalyst containing 87% by weight of silica ($SiO_2$) and 13% by weight of alumina ($Al_2O_3$). In making such a product, the concentration of alumina, expressed as $Al_2O_3$, in the slurry prior to filtration or dewatering is preferably about 0.8% by weight.

The invention is particularly well adapted for the manufacture of silica-alumina compositions containing on a dry basis 20% to 40% by weight of alumina, expressed as $Al_2O_3$, the remainder being substantially silica. Such compositions have greater steam stability than standard catalysts containing say 13% of alumina.

The source of the silica employed in the practice of the invention can be commercial water glass or any other alkaline aqueous solution of sodium silicate or potassium silicate. The silicate employed is preferably an orthosilicate but can also be a meta silicate. A typical sodium silicate solution suitable for the practice of the invention consists essentially of 28% $SiO_2$ and 9.1% $Na_2O$, the remainder being water.

The acid which is added to the aqueous alkaline solution to precipitate the silica can be any dilute acid but is preferably a dilute mineral acid, for example, sulfuric acid or hydrochloric acid. The concentration, temperature and rate of acid addition can be varied in order to vary the pore volume, the pore diameter and the surface characteristics of the finished catalysts. When the acid employed is an aqueous solution of sulfuric acid, it is preferable to use a concentration of around 25% to 35% $H_2SO_4$. Higher concentrations can be used but concentrations which are too high should be avoided to avoid the generation of heat and localized action. With the higher concentrations of acid it is desirable to maintain adequate agitation and this is true even where the acid concentration of sulfuric acid is around 35%.

The relative concentration of $SiO_2$ in the slurry during the acid addition is comparatively low, say around 1% to 10% by weight, and the reaction which occurs is not violent because of the relatively large quantities of water present. Nevertheless, the generation of heat and localized action are to be avoided by using the precautions previously indicated.

The temperature of the reaction mixture is subject to variation but is preferably within the range of 40° F. to 140° F. in each of the various stages of the reaction. In general, the temperature of the reaction mixture during the precipitation of the silica and the alumina should be above the freezing temperature and below the boiling point of water.

If the precipitation has been effected at a low temperature, and it is desired to filter the resultant slurry before drying, it has been found that heating the slurry to a temperature within the range of 100° F. to 190° F., preferably about 110° F. to 150° F. is an aid to filtration.

The slurry containing the silica and alumina in hydrous form, for example, as a hydrous gel, is preferably dried in such a manner as to form microspherical particles. This is preferably accomplished by spray drying. The spray drying temperature is ordinarily within the range of 200° F. to 1000° F. The temperature used will depend on such factors as the quantity of material to be dried and the quantity of air used in the drying. The evaporation rate will vary depending upon the quantity of air used in the drying. The temperature of the particles which are being dried is preferably within the range of 150–300° F. at the completion of the drying.

The drying is preferably effected by a process in which the silica-alumina particles to be dried and a hot air stream are moving in the same direction for the entire drying period. This is usually referred to as concurrent drying as distinguished from countercurrent drying of the type carried out in a cyclone apparatus. Concurrent drying has the advantage for the purpose of the present invention that it gives large particles an opportunity to dry before they can adhere to the walls of the drier or to other particles.

The invention will be further illustrated but is not limited by the following examples in which the quantities are stated in parts by weight unless otherwise indicated.

*Example I*

To 6200 gallons of water and 1250 gallons of sodium silicate (28.8% $SiO_2$, 9.1% $Na_2O$) at a temperature of 82° F. was added with agitation 442 gallons of 35% sulfuric acid over a 35 minute period.

To the resultant precipitated silicic acid gel was added 375 gallons of a 25% aqueous solution of aluminum sulfate and the resultant mixture was thoroughly agitated. Next there was added 105 gallons of an aqueous solution of 42% sodium aluminate ($Na_2Al_2O_4$) containing 4.5% excess sodium hydroxide (NaOH). The sodium aluminate was diluted with 10 volumes of water for each volume of sodium aluminate solution prior to addition to the batch.

In this process the addition of the sulfuric acid to the alkaline sodium silicate lowers the pH but the resultant mixture is still on the alkaline side. The addition of the aluminum sulfate causes the precipitation of alumina and at the same time reduces the pH to the acid side around pH 2 or below. The subsequent addition of the sodium aluminate adjusts the pH by raising it to around 5.3, simultaneously impregnating the silica gel with alumina precipitated both from the aluminum sulfate and the sodium aluminate.

The resultant slurry was filtered on a vacuum rotary filter. The filter cake was then reslurried with water to a pumpable mixture and spray dried by concurrent drying in the manner previously described herein.

An aqueous suspension of the spray dried material was prepared and filtered on washing filters to remove soluble salts to limits as follows:

Sodium salts, expressed as $Na_2O$ _____ Less than 0.02% by weight.

Sulfate salts, expressed as $SO_4$ _____ Less than 0.5% by weight.

The purified washed catalyst was so dried that the particle temperature did not exceed 230° F. and was subjected to such drying until the volatile content was below 15% by weight. The silica ($SiO_2$) content was about 87% by weight and the alumina ($Al_2O_3$) content about 13% by weight, on a dry basis.

*Example II*

To 3100 gallons of water and 598 gallons of sodium silicate (28.6% $SiO_2$) at a temperature of about 80° F. was added with agitation 216 gallons of 35% sulfuric acid in 60 minutes.

To the resultant precipitated silicic acid gel was added 260 gallons of an aluminum sulfate solution (7.6% $Al_2O_3$) and the resultant mixture was thoroughly agitated. Next there was added 115 gallons of an aqueous solution of 42% sodium aluminate ($Na_2Al_2O_4$) containing 4.5% excess sodium hydroxide (NaOH) diluted with 1035 gallons of water.

To the resultant mixture there was added 2000 gallons of water. The final temperature was about 110° F. and the final pH around 5.2. The resultant slurry was heated to 190° F. and filtered on a vacuum rotary filter. The filter cake was then reslurried with water to a pumpable mixture and spray dried by concurrent drying in the manner previously described.

An aqueous suspension of the spray dried material was prepared and filtered on washing filters to remove soluble salts to the limits set forth in Example I.

The purified washed catalyst was so dried that the particle temperature did not exceed 230° F. and was subjected to such drying until the volatile content was below 15% by weight. The silica ($SiO_2$) content was about 79.8% by weight and the alumina ($Al_2O_3$) content was about 21.2% by weight, on a dry basis.

*Example III*

To 5820 gallons of water and 1175 gallons of sodium silicate (28.6% $SiO_2$) at a temperature of 86° F' was added with agitation 404 gallons of 35% sulfuric acid over a period of 60 minutes.

To the resultant precipitated silicic acid gel was added 765 gallons of an aqueous solution of aluminum sulfate (7.6% $Al_2O_3$) and the resultant mixture was thoroughly agitated. Next there was added 220 gallons of sodium aluminate (27% $Al_2O_3$) aqueous solution dissolved in 1760 gallons of water. The sodium aluminate solution was added over a period of 25 minutes and the final pH was around 5.0 to about 5.2. The catalyst was worked up as described in Example I and the final catalyst, on a dry basis, contained 77% silica ($SiO_2$) and 23% alumina ($Al_2O_3$).

*Example IV*

A solution of sodium silicate in water was prepared by mixing 1785 cc. of sodium silicate (28.6% $SiO_2$) with 9300 cc. of water, the final temperature being around 120° F.

To the sodium silicate solution was added with agitation 545 cc. of 35% sulfuric acid at a temperature of 86° F. over a period of 64 minutes. The temperature of the mixture was around 101° F. and the pH around 10.5.

To the resultant precipitated silicic acid gel was added 1416 cc. of an aqueous solution of aluminum sulfate (7.6% $Al_2O_3$) at a temperature of 88° F. in 9 minutes.

To the resultant solution was added 420 cc. of sodium aluminate (27% $Al_2O_3$) dissolved in 4200 cc. of water at 85° F. in a period of 8 minutes, the final temperature of the mixture being around 94° F. and the pH around 4.4 to 4.7.

The final slurry was dewatered and the filter cake dried for 3 hours at a temperature of 220 to 240° F. to a moisture content of 45%. The dried filter cake was washed to remove sodium and sulfate ions and then dried.

*Example V*

An aqueous solution of sodium silicate was prepared by dissolving 3090 cc. of sodium silicate (28.6% $SiO_2$) in 1650 cc. of water, the final temperature being around 122° F.

To the sodium silicate solution was added with agitation 980 cc. of 35% sulfuric acid having a temperature around 100° F., the addition being made in 60 minutes. The final temperature of the slurry was 112° F. and the pH around 9.0.

To the resultant precipitated silicic acid gel was added 1540 cc. of an aqueous solution of aluminum sulfate (7.6% $Al_2O_3$) at a temperature of 90° F. in a period of about 3 minutes. The resultant slurry was agitated for an additional 15 minutes.

To the slurry obtained as previously described was added a solution made by dissolving 1960 cc. of sodium aluminate (27% $Al_2O_3$) in 1500 cc. of water at a temperature of 120° F. This addition was made in 5 minutes and the final temperature was 110° F. The final pH was about 4.8 to 5.0.

The final slurry was dewatered and the resultant filter cake dried, purified and redried in the general manner described in the previous example.

*Example VI*

To 6450 gallons of water and 1250 gallons of sodium silicate (28.8% $SiO_2$, 9.1% $Na_2O$) at a temperature of 80° F. was added with agitation 530 gallons of 35% sulfuric acid over a period of 35 minutes. To the resultant precipitated silicic acid gel was added 143 gallons of a 25% aqueous solution of aluminum sulfate and the resultant slurry was thoroughly agitated. Next there was added 1225 pounds of solid sodium aluminate dissolved in the minimum amount of water required to produce an aqueous solution. The solid sodium aluminate had the following analysis:

| Ingredients: | Percent by weight |
| --- | --- |
| $Na_2Al_2O_4$ | 71 |
| Excess NaOH | 5.5 |
| Excess $Na_2CO_3$ | .3 |
| Volatile | Approximately 23.2 |

Additional acid was added as necessary to keep the pH of the solution at approximately 7.0.

The resultant composition was worked up into a catalyst in the manner described in Example I.

*Example VII*

To 6600 gallons of water and 1250 gallons of sodium silicate (28.8% $SiO_2$, 9.1% $NiO_2$) at a temperature of 82° F. was added with agitation 505 gallons of 35% sulfuric acid over a 35 minute period.

To the resultant precipitated silicic acid gel was added with agitation 210 gallons of a 25% aqueous solution of aluminum sulfate. Next there was added with agitation a solution made by dissolving 1050 pounds of the solid sodium aluminate described in the previous example in 1100 gallons of water.

The catalyst was worked up in the manner described in Example I.

The foregoing examples illustrate the preparation of silica-alumina catalysts with various proportions of alkali metal silicate, acid, soluble aluminum salts containing the aluminum in the cation portion and soluble aluminum salts containing the aluminum in the anion portion. In all cases satisfactory cracking catalysts are obtained without employing a volatile neutralizing agent such as aqueous ammonia. The optimum results appear to be obtained by the procedures used in Examples I to V wherein a very dilute solution of sodium aluminate in water is employed in each case. The catalysts having a higher alumina content within the range of 20% to 40% by weight alumina, the remainder being silica, on a dry basis, appear to have greater steam stability than catalysts containing say 13% alumina and 87% silica, on a dry basis.

The catalysts prepared as described in the examples were evaluated in a fluidized fixed bed type of petroleum hydrocarbon cracking unit using a cracking temperature of around 860° F. to 870° F. and a processing period of 15 minutes. The total volume of oil was 142 cc. and the quantity of catalyst charged to the unit was varied to obtain a desired conversion.

Prior to use, the catalyst was steamed for 10 hours at a pressure of 40 pounds per square inch gauge at a temperature of 1200° F. In this steaming process water is allowed to drip on the catalyst and heat is applied separately while maintaining the aforesaid pressure.

In each series of tests comparative evaluations were made with a standard catalyst prepared by the conventional ammonium hydroxide neutralizing method.

The catalyst prepared as described in Example I showed equivalent gasoline production to the standard catalyst with lower dry gas formation and an approximately equivalent amount of catalyst deposit (coke, etc.,) at three different rates of conversion, namely 55.2%, 63.0% and 69.6%.

The catalysts of Examples VI and VII give slightly less gasoline and more gaseous products, as well as slightly more catalyst deposits (i.e., had a higher coke factor) than did the standard catalysts prepared by the conventional ammonium hydroxide neutralization but were still generally satisfactory even though less effective than the catalysts prepared by the employment of more dilute sodium aluminate solutions.

The silica-alumina catalysts (e.g., Examples II and III) relatively high in alumina appeared to have greater steam stability and to be operable at higher equilibrium conditions making it possible to obtain better product distribution. As will be recognized by those skilled in the art, steam stability is an important catalyst characteristic because steam is in contact with the catalyst during the oil stripping and regeneration periods of normal cat cracking operations.

The silica-alumina compositions herein described can be employed alone or in association with other oxides, including, for example, magnesia, zirconia, titania, thoria, chromium oxides and/or boron oxides.

In addition to providing a method of preparing silica-alumina compositions by a process which avoids the use of ammonium hydroxide, the invention also provides a method of preparing silica-alumina microspheres which are characterized by a clear, glass-like structure exhibiting continuity of phase. This structure has the advantage that it contains no opaque particles and no interfaces between different phases which would tend to produce a particle having poor attrition characteristics. It will be appreciated that this is especially advantageous where the silica-alumina microspheres are employed as catalysts or as carriers for catalysts in fluidized processes where the catalyst is maintained in suspension in the reacting vapors during the reaction.

The expression "alumina in hydrous form" is intended to cover the various states in which $Al_2O_3$ exists when combined with water. The expression "silica in hydrous form" is intended to cover the various states in which $SiO_2$ exists when combined with water.

The invention is hereby claimed as follows:

1. A process for preparing clear, glass-like silica-alumina compositions suitable for use as a petroleum hydrocarbon cracking catalyst which comprises precipitating silica in hydrous form by adding to an aqueous alkali metal silicate solution a quantity of a mineral acid sufficient to precipitate the silica in hydrous form while retaining the pH above about 5, said acid being from the group consisting of sulfuric acid and hydrochloric acid, adding to the resultant slurry an aqueous solution of a soluble acidic aluminum salt containing the aluminum in the cation portion, said acidic aluminum salt being from the group consisting of aluminum sulfate and aluminum chloride, adding to the resultant slurry an aqueous solution of sodium aluminate sufficient only to partially neutralize said slurry and recovering the resultant solid product containing silica in hydrous form impregnated with alumina simultaneously precipitated from an aluminum salt in which the aluminum exists in the cation portion of the salt and from the sodium aluminate.

2. A process for preparing clear, glass-like silica-alumina compositions suitable for use as a petroleum hydrocarbon cracking catalyst which comprises precipitating silica in hydrous form by adding to an aqueous alkali metal silicate solution a quantity of a mineral acid sufficient to precipitate the silica in hydrous form while retaining the pH above about 5, said acid being from the group consisting of sulfuric acid and hydrochloric acid, adding to the resultant slurry an aqueous solution of a soluble acidic aluminum salt containing the aluminum in the cation portion, said acidic aluminum salt being from the group consisting of aluminum sulfate and aluminum chloride, adding to the resultant slurry an aqueous solution of sodium aluminate sufficient only to partially neutralize said slurry, the weight ratio of water to said salt, expressed as $Na_2Al_2O_4$, being at least 7:5 to 1, and recovering the resultant solid product containing silica in hydrous form impregnated with alumina simultaneously precipitated from an aluminum salt in which the aluminum exists in the cation portion of the salt and from the sodium aluminate.

3. A process for preparing clear, glass-like silica-alumina compositions suitable for use as a petroleum hydrocarbon cracking catalyst which comprises precipitating silica in hydrous form by adding to an aqueous alkali metal silicate solution a quantity of a mineral acid sufficient to precipitate the silica in hydrous form while retaining the pH above 7, said acid being from the group consisting of sulfuric acid and hydrochloric acid, adding to the resultant slurry a quantity of an aqueous solution of a soluble acidic aluminum salt containing the aluminum in the cation portion, said acidic aluminum salt being from the group consisting of aluminum sulfate and aluminum chloride, said quantity being sufficient to render the mixture acidic and to precipitate alumina in hydrous form, adding to the resultant mixture a quantity of an aqueous solution of sodium aluminate and in an amount sufficient only to partially neutralize said slurry and to precipitate alumina in an acidic medium, and recovering the resultant solid product containing silica in hydrous form impregnated with alumina simultaneously precipitated from an aluminum salt in which the aluminum exists in the cation portion of the salt and from the sodium aluminate.

4. A process for preparing clear, glass-like silica-alumina compositions suitable for use as a petroleum hydrocarbon cracking catalyst which comprises precipitating silica in hydrous form by adding to an aqueous alkali metal silicate solution a quantity of a mineral acid sufficient to precipitate the silica in hydrous form while retaining the pH above about 5, said acid being from the group consisting of sulfuric acid and hydrochloric acid, adding to the resultant slurry an aqueous solution of a soluble acidic aluminum salt containing the aluminum in the cation portion, said acidic aluminum salt being from the group consisting of aluminum sulfate and aluminum chloride, adding to the resultant slurry an aqueous solution of sodium aluminate sufficient only to partially neutralize said slurry and recovering the resultant solid product containing silica in hydrous form impregnated with alumina simultaneously precipitated from an aluminum salt in which the aluminum exists in the cation portion of the salt and from the sodium aluminate, the quantities of said silicate and of said aluminum salts being sufficient to produce a silica-alumina composition containing about 55% to 95% by weight of silica, expressed as $SiO_2$, and about 45% to 5% by weight of alumina, expressed as $Al_2O_3$, on a dry basis.

5. A process for preparing clear, glass-like silica-alumina compositions suitable for use as a petroleum hydrocarbon cracking catalyst which comprises precipitating silica in hydrous form by adding to an aqueous alkaline sodium silicate solution a quantity of an aqueous solution of sulfuric acid sufficient to precipitate the silica in hydrous form while retaining the pH of the resultant slurry above 7, adding to the resultant slurry a quantity of an aqueous solution of aluminum sulfate sufficient to render the mixture acidic to a pH below about 2, adding to the resultant slurry an aqueous solution of sodium aluminate sufficient only to partially neutralize said slurry and to precipitate alumina in hydrous form both from the aluminum sulfate and from the sodium aluminate and recovering the resultant product containing silica in hydrous form impregnated with alumina precipitated from the aluminum sulfate in which the aluminum exists in the cation portion of the salt and from sodium aluminate in which the aluminum exists in the anion portion of the salt.

6. A process for preparing clear, glass-like silica-alumina compositions suitable for use as a petroleum hydrocarbon cracking catalyst which comprises precipitating silica in hydrous form by adding to an aqueous alkaline sodium silicate solution a quantity of an aqueous solution of sulfuric acid sufficient to precipitate the silica in hydrous form while retaining the pH of the resultant slurry above 7, adding to the resultant slurry a quantity of an aqueous solution of aluminum sulfate sufficient to render the mixture acidic to a pH below about 2, adding to the resultant slurry an aqueous solution of sodium aluminate sufficient only to partially neutralize said slurry and to precipitate alumina in hydrous form both from the aluminum sulfate and from the sodium aluminate, the weight ratio of water to $Na_2Al_2O_4$ in said sodium aluminate solution being at least about 15:1, and recovering the resultant product containing silica in hydrous form impregnated with alumina precipitated from the aluminum sulfate in which the aluminum exists in the cation portion of the salt and from sodium aluminate in which the aluminum exists in the anion portion of the salt.

7. A process for preparing clear, glass-like silica-alumina microspheres suitable for use as a petroleum hydrocarbon cracking catalyst which comprises precipitating silica in hydrous form by adding to a dilute alkaline aqueous sodium silicate solution a quantity of an aqueous solution of sulfuric acid sufficient to give the resultant mixture a pH within the range of 8 to 10.5, adding to the resultant slurry a quantity of an aqueous solution of aluminum sulfate sufficient to give the resultant mixture a pH below about 2, adding to the resultant slurry a dilute aqueous solution of sodium aluminate sufficient to give the resultant slurry a pH of about 5 to about 5.5, filtering the resultant slurry, reslurrying the filter cake to a total solids content of at least 8% by weight of the composition, spray drying the resultant product, washing the resultant microspheres with water to remove soluble salts and drying the purified washed product at particle temperatures not exceeding 230° F., the quantities of said silicate and said aluminum salts being sufficient to produce a silica-alumina composition containing about 55% to 95% by weight of silica, expressed as $SiO_2$, and about 45% to 5% by weight of alumina, expressed as $Al_2O_3$, on a dry basis.

8. A process for preparing silica-alumina microspheres suitable for use as a petroleum hydrocarbon cracking catalyst and having a particle size within the range from 20 to 100 microns and containing 20% to 40% by weight of alumina, expressed as $Al_2O_3$, the remainder being substantially silica, said microspheres being clear and glass-like with substantially no opaque particles and no interfaces between the different phases of the microsphere which would tend to produce a weaker particle, and exhibit high surface area, optimum pore volume and satisfactory density suitable for use as catalysts for the cracking of petroleum hydrocarbons, which consists essentially of adding to a dilute alkaline aqueous sodium silicate solution a quantity of sulfuric acid having a concentration of around 25% to 35% $H_2SO_4$ sufficient to precipitate silica in hydrous form and give the resultant mixture a pH within the range of 8 to 10.5, adding to the resultant slurry a quantity of an aqueous solution of aluminum sulfate sufficient to give the resultant mixture a pH below about 2, adding to the resultant slurry a dilute aqueous solution of sodium aluminate sufficient to give the resultant slurry a pH of about 5 to about 5.5, filtering the resultant slurry, reslurry the filter cake to a total solids content of at least 8% by weight of the composition, spray drying the resultant product at temperatures within the range of 200° F. to 1000° F. such that the temperature of the particles being dried are within the range of 150° F. to 300° F. at the completion of the drying, washing the resultant microspheres with water to remove soluble salts and drying the purified washed product at particle temperatures not exceeding 230° F., the quantities of said silicate and said aluminum salts being sufficient to produce a silica-alumina composition containing 20% to 40% by weight of alumina, expressed as $Al_2O_3$, on a dry basis, and the remainder being substantially silica, expressed as $SiO_2$.

9. A process of preparing a silica-alumina composition which comprises preparing hydrated silica gel by adding sulfuric acid to an aqueous alkali metal silicate solution, adding to the resulting hydrated silica gel an aqueous solution of aluminum sulfate, adding to the resultant aqueous slurry an aqueous solution of sodium aluminate, the aluminum sulfate and sodium aluminate being in an amount to precipitate aluminum oxide on the hydrated silica gel and produce a silica-alumina composition containing about 60% to 95% silica.

References Cited in the file of this patent

UNITED STATES PATENTS

| | | |
|---|---|---|
| 1,755,496 | Behrman | Apr. 22, 1930 |
| 1,928,123 | Bruce | Sept. 26, 1933 |
| 2,282,922 | Ahlberg et al. | May 12, 1942 |
| 2,283,172 | Bates | May 19, 1942 |